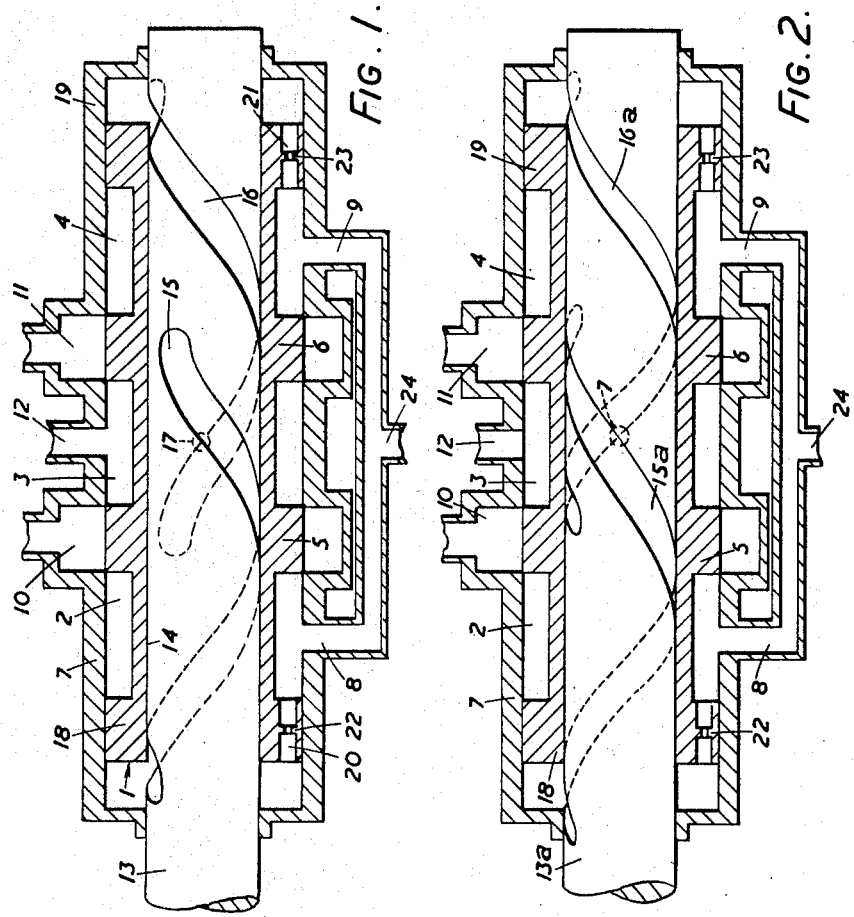

United States Patent Office 3,106,224
Patented Oct. 8, 1963

3,106,224
SERVO OPERATED HYDRAULIC VALVES

Norman Moss, London, and Michael John Broad, Bush Hill Park, Enfield, England, assignors to The Plessey Company Limited, London, England, a British company Filed July 31, 1961, Ser. No. 128,934
Claims priority, application Great Britain Aug. 2, 1960
2 Claims. (Cl. 137—625.63)

This invention relates to servo-operated hydraulic valves and has for an object to provide an improved servo-operated hydraulic valve in which a spool-type slide valve is moved by hydraulic forces to a position corresponding to the rotary position of a control shaft.

According to the invention a shaft extends sealingly through an axial bore of a spool-type slide valve element, and two helical grooves of equal magnitude and direction of helical pitch, respectively communicating with chambers containing the two ends of the slide valve element, are provided on one of the co-operating cylindrical surfaces of the spindle and bore and co-operate with diametrically opposite bores in the other of said surfaces in such manner that rotation of the shaft in one direction will progressively increase the exposed part of the cross-section of one of said bores at the edge of one of the grooves and decrease the exposed portion of the cross-section of the other bore at the edge of the other groove, while parallel flows of liquid from a common source are arranged to pass through each hole, the chamber facing the associated end of the valve element and a fixed metering orifice, whereby rotation of the shaft in one direction will produce a pressure difference between the two ends of the valve element, causing the same to be moved in such direction as to restore equality of the exposed cross-sections of the two apertures.

Two embodiments of the invention are respectively illustrated in FIGURE 1 and FIGURE 2 of the accompanying drawings, both of which are axial sections.

Referring now first to FIGURE 1, a spool-type slide valve element 1, which is prevented from rotating by known key means, not shown, has three annular ports 2, 3 and 4 separated by metering lands 5 and 6 and slides in a cylindrical bore of a housing 7 having inlet ports 8 and 9, service ports 10 and 11 and a drain port 12. A cylindrical spindle 13, which extends with a sealing fit through the two ends of the housing 7 and through an axial bore 14 of the valve spool 1, is free to rotate in the housing 7 but prevented from axial movement relative thereto. Two helical grooves 15 and 16, formed in the surface of the spindle 13 and having both same pitch and direction of rotation, are spaced from each other by approximately one half helical pitch each groove extending from one end of the housing cavity past a pair of diametrically opposite radial bores 17 provided in the valve spool 1 inside the central port 3 of the valve spool, and further by a distance which is at least equal to the stroke of the valve spool in the direction in question when the spool is in its central position, in which the two grooves 15 and 16 respectively expose equal parts of the two bores 17. The two ends of the bore of housing 7 are separated from the two outer ports 2 and 4 of the valve spool by lands 18 and 19, and these lands are perforated by passages 20 and 21, each containing a fixed metering orifice 22 and 23 respectively. In the illustrated central position two branch flows of oil are established respectively going from the pressure oil inlet 24 through ports 2 and 4, passages 20 or 21 and orifices 22 or 23 to the two end chambers of the bore in housing 7, and thence through grooves 15 and 16 respectively and bores 17 to annular chamber 3 and drain port 12. As a result equal pressures will establish themselves at the two ends of the bore of the valve housing 7, so that the valve spool will remain in its illustrated position.

Assuming that the control shaft 13 has been turned by a small angle in one direction, the exposed portion of one of the apertures 17 will increase and that of the other will decrease due to the movement of the helical grooves, thus causing the pressure in the chamber facing one end of the valve spool to increase and that in the chamber facing the other end to decrease. As a result the spool will move in such a direction as to restore equality of the exposed portions of the two bores 17, and this movement will continue as long as the rotation of the shaft continues, thus producing an axial movement of the spool valve which is proportional to the rotary displacement of the control shaft. Rotation of the shaft in the opposite direction will produce similar movement of the valve spool in the opposite direction.

In FIGURE 2 of the drawing structurally identical parts are given the same reference numbers as in FIGURE 1, although the functions of some of these parts are different due to the fact that the oil is arranged in FIGURE 2 to enter the valve housing under pressure through port 12 and flow away to drain through connection 24.

In order to achieve an automatic follow-up effect similar to that of FIGURE 1, the grooves **15*a* and 16*a* are so displaced relative to the grooves 15 and 16 of FIGURE 1 that their opposite edges are utilised to produce the controlling effect on the bores 17 so that a rotation of the shaft 13*a* in the same direction as that of shaft 13 in FIGURE 1 will alter the exposed cross-sections of the two bores 7 in opposite directions. For while in the case of FIGURE 1 the reduction of the exposed portion of one of the apertures 7** causes increasing restriction of the flow from one of the end chambers to drain and therefore an increase in the pressure in said chamber, in the case of FIGURE 2, the same rotation of the control shaft will produce an increase in the exposed cross-section of said bore; this will reduce the pressure drop between the oil inlet and the end chamber in question, and thereby again produce an increase of pressure facing the same land of the spool valve, thus producing movement of the spool valve in the same direction as in FIGURE 1.

What we claim is:
1. A servo-operated hydraulic slide valve, comprising a valve housing having a cylindrical bore closed at each end by an end wall having a bore coaxial with said cylindrical bore, a cylindrical spindle extending through the housing and sealingly mounted in the bores of said end walls for rotation without axial movement, said spindle having, inside the housing, two helical grooves of equal magnitude and sense of helical pitch respectively communicating with a closed bore and, a spool-type slide-valve sleeve having two inner and two outer external lands axially spaced from each other and slidably and sealingly fitted in the bore of the housing and sealingly engaging the spindle throughout the length of the sleeve, and two diametrically opposite approximately radial bores approximately half-way between the two inner lands, said sleeve being freely movable inside the housing bore for a limited stroke and including means to prevent its free rotation about its axis, the housing having five ports communicating with the housing bore at axially spaced positions so chosen that when the sleeve is in a central position, the innermost port is about half-way between the inner lands, the two outermost ports are each half-way between one of said inner lands and the adjacent outer land, and the two intermediate ports are respectively blanked by the two inner lands of the sleeve, the helical grooves being so arranged on the spindle that for each rotational position of the spindle there is a longitudinal position of the sleeve in which the two radial bores have each part of its cross-section open to the two grooves respectively and another part covered by part of the spindle adjacent to the edge of such groove and that rotation of the spindle in either direction without movement of the slide will progressively increase the covered part of one and decrease the covered part of the other bore, the housing having a first external connection communicating with the innermost port, a second external connection communicating with the two outermost ports in parallel, and two service connections respectively communicating with the two intermediate ports, the valve also having two passages, each having a metering restriction, respectively connecting the parts of the housing bore at the two sides of the two outer lands of the sleeve throughout the stroke of the sleeve.

2. A valve as claimed in claim 1, wherein the restricted passages are respectively provided in the two outer lands of the sleeve.

References Cited in the file of this patent
FOREIGN PATENTS 464,891     Great Britain _____ Apr. 27, 1937